Patented June 3, 1952

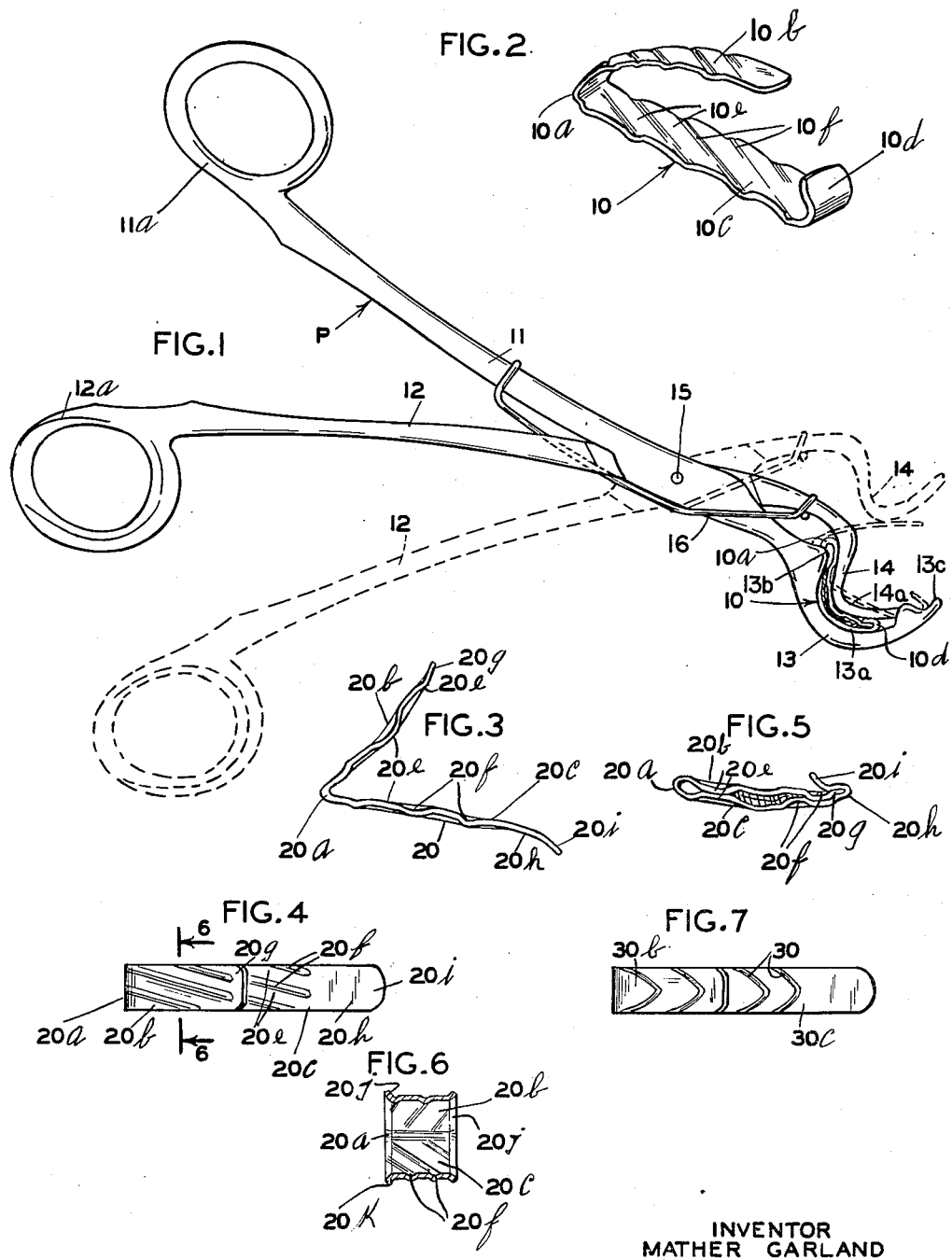

2,598,901

UNITED STATES PATENT OFFICE 2,598,901

CLAMP FOR CONSTRICTING FLEXIBLE
TUBULAR ELEMENTS AND THE LIKE

Mather Garland, Mound, Minn.

Application March 10, 1950, Serial No. 148,852

5 Claims. (Cl. 128—346)

1

This invention relates to deformable clamps adapted to clamp and efficiently seal highly flexible tubular elements including anatomical tissue structures.

The instant application discloses several improvements in structure upon the various clamp constructions illustrated in my co-pending applications, S. N. 104,014 filed July 11, 1949 and S. N. 131,733 filed December 8, 1949.

While my improved deformable clamp is particularly intended for surgical use to constrict or seal various tissues and cords such as umbilical cords, blood vessels and intestines, it is also equally applicable for clamping and sealing highly flexible tubes in surgical, medical and other use such as for example, catheter tubes.

It is an object of my present invention to provide an improved clamp construction of the class described, constructed preferably from an integral strip of material adapted to be bent and to retain a bent and folded form and capable of being operatively applied by hand or by instrument to very quickly and efficiently constrict and seal a flexible tube or the like.

A further object of my present invention is the provision of a very simple, inexpensive clamp of the type described wherein the collapsing and clamping of a flexible tube is produced along a tortuous and multiribbed sealing zone.

More specifically, it is an object to provide a clamp of the general structure disclosed in my said copending applications, but having formed upon the opposed clamping legs thereof, embossments or corrugations, the greater portions at least of which extend diagonally to the legs of the clamp and also diagonally but nevertheless transversely of the tissue or flexible tube to be constricted and sealed.

Another object is the provision of an improved, preferably integral clamp constructed from ductile material which has an element integrally formed at the extremity of the longer clamping leg to facilitate removal and reuse of the clamp for certain specific purposes.

These and other objects and advantages of my invention will more fully appear from the following description made in connection with the accompanying drawings wherein like reference characters refer to similar parts throughout the several views and in which:

Fig. 1 is a side elevation illustrating in full lines the closed and fully clamped position of an instrument or forceps for applying certain forms of my clamp construction and showing a clamp of the form illustrated in Fig. 2 applied

2 therein, the dotted lines indicating the open position of one of the jaws of the instrument and a preformed clamp in position to apply to a flexible element;

Fig. 3 is a view on a larger scale showing a somewhat different form of my clamp adapted for application by hand bending and finger pressure;

Fig. 4 is a plan view of the clamp shown in Fig. 3 in its preformed shape for application to a tubular element;

Fig. 5 is a side elevation of the clamp in Fig. 3 shown as operatively applied to a tubular element such as an umbilical cord;

Fig. 6 is a cross section on a larger scale taken on the line 6—6 of Fig. 4; and Fig. 7 is a top plan view showing a somewhat different form of clamp in its preformed, opened position.

The clamp shown in Fig. 2 is integrally formed from a strip of non-corrosive, preferably ductile metal such as thin aluminum which is capable of being forcibly bent, corrugated or embossed and which will retain its shape when bent. The clamp indicated as an entirety by the numeral 10 before application thereof, is preformed in the general shape of a letter V having an apex 10a disposed medially of its length and having a pair of legs 10b and 10c diverging therefrom. The medial bend or apex 10a divides the integral strip 10 into portions adapted to clamp and retain under compression therebetween, a flexible tube or shank. The lower leg 10c of the clamp, as shown, in Fig. 2, is substantially longer than the upper concavely arced leg 10b and has its extremity inturned to form a normally open hook or locking flange 10d related as shown to the adjacent portion of leg 10c in the manner of a small V. The leg 10c as shown, is substantially straight from the apex 10a to the flange 10d. The greater portions of the lengths of clamping legs 10b and 10c as shown in Fig. 2, are diagonally corrugated to provide in opposing clamping faces of the legs 10b and 10c, mating ribs 10e and channels 10f respectively. These corrugations or embossments are readily formed in the ductile strip 10 by dies during the manufacture and produce collectively, a tortuous sealing zone extending diagonally of the legs and also diagonally of the flexible member clamped and sealed. The corrugations forming ribs 10e and channels 10f do not extend to or traverse the ends of the legs but leave substantially flat extremities and in the case of the lower leg 10c the entire locking hooking structure 10d is free of corrugation. The clamp therefore constitutes a pair of opposing clamping legs 10b and 10c in the form of strip portions constructed from bendable material adapted to retain its shape when bent with the apex portion 10a being a means for fixedly interconnecting the legs. The corrugations or ribs have at least portions thereof extending diagonally of the legs.

In Fig. 1 a special tool or instrument, preferably in the form of a pair of pliers P having a pair of crossed shanks 11 and 12 pivoted adjacent their outer ends upon a pivot screw 15 and having thumb and finger handles 11a and 12a respectively, is shown. Shank 11 has integrally formed therewith, a jaw 13 having a curved outer portion and provided with a substantially arcuate clamping surface 13a near the outer extremity thereof and having a notched shoulder 13b disposed just inwardly of the concave portion for seating and receiving the apex 10a of one of the clamps. The jaw 13 at its outer extremity is provided with an abutment finger 13c having shouldered relation to form a seat to initially abut and retain the outer extremity of the leg 10c of the clamp. The shank 12 of the pliers has integrally formed or otherwise rigidly secured therewith, a reversely curved jaw indicated as an entirety by the numeral 14 and having at its outer portion a convex clamping element 14a opposed to the clamping jaw portion 13a and complementarily shaped thereto. I prefer to provide means such as a clip spring 16 for urging the shanks and consequently the jaws 13 and 14 together with light pressure adequate to retain the clamp in its open position. One end of clip 16 is secured to the shank 11, while the intermediate portion of the clip is curved about the opposite side of shank 12 and the opposite end of the clip is secured to the rear portion of jaw 14. The jaws 13 and 14 of said instrument or pliers are provided with retaining elements for holding the clamp 10 in open position as illustrated in dotted lines in Fig. 1 and cooperate as anvils and forming dies to apply the clamping legs against an anatomical tube or other flexible element, to project the extremity of the upper clamping leg 10b beneath the locking flange or hook 10d of the lower leg to clinch the locking flange as shown in Fig. 1 and to simultaneously with said clinching action and thereafter deform and bow the doubled clamp bodily for additional sealing action and for causing a greater rigidity to be effected on the applied clamp. In Fig. 1 an umbilical cord is shown in cross section, flattened and sealed by the tortuous clamping zone provided by the legs 10b and 10c of the clamp.

In Figs. 3 to 6 inclusive, I illustrate another form of my invention wherein the clamp is again constructed integrally from a strip of ductile, non-corrosive metal such as aluminum, bent intermediately into the general form of a V along a transverse apex 20a and having diverging upper and lower legs 20b and 20c respectively. The two legs 20b and 20c are corrugated as in the form of clamp shown in Fig. 2 to form cooperating and mating ribs 20e at the underside of the upper leg and channels 20f in the upper face of the lower and longer leg. The said corrugations do not extend to the outer ends of the legs 20b and 20c but leave on the upper leg, a substantially flat extremity 20g which is adapted to be retained and clinched by a flatted locking portion 20h of the lower leg. The extremity of the lower leg is sharply angled relative to the locking portion 20h in its preformed state to form a removal tip or detent 20i which when the clamp is closed operatively, as shown in Fig. 5, extends angularly to the doubled body so that the clamp may be readily disengaged and opened by fingers or instrument, with or without gloves on the hand of the operator. The clamp shown in Figs. 3 to 5 is adapted to be set upon an umbilical cord, blood vessel or highly flexible tube such as a catheter tube, by hand, the two legs 20b and 20c being first pressed together to constrict the tube and thereafter the locking end 20h being bent upwardly and then inwardly to clinch against the extremity 20g of the upper leg. Thereafter, further clamping action may be obtained by bodily deforming or bowing the applied clamp into somewhat arcuate shape, thereby further compressing the tubular element along the tortuous clamping zone. In this connection, it will be seen that with the plurality of ribs and channels 20e and 20f disposed diagonally of the clamp and also diagonally of the tubular tissue or element, a plurality of separate clamping and drawing actions are produced upon the flexible element to tightly stretch and seal the element in a most effective manner.

It should be noted particularly from Fig. 6, that in forming the clamp shown in all of the views herein, the cooperating clamping surfaces of the two legs of the clamp are in each instance at their longitudinal edges, outturned away from the clamping zones, to form outturned flanges 20j and 20k in the upper and lower legs respectively. These outturned or rounded edges prevent any cutting or injury to delicate tissues or other tubular elements constricted by the clamps.

The form of the invention shown in Fig. 7 is substantially similar to the form described in Figs. 3 to 6 inclusive with the exception that the embossments or ribs and channels of the two legs 30b and 30c are in the form of parabola curves traversing the widths of the respective legs. The ribs extending from the inner face of the upper leg 30b interfit with mating grooves or channels 30f formed in the upper face of the lower and longer leg 30c. In this form, the tubular element is clamped throughout in general a tortuously extending clamping zone and again a plurality of separate clamping and restricting actions occur in operation. This clamp is also constructed for hand operation and application to the flexible element.

The forms of the invention illustrated in Figs. 3 to 7 inclusive in addition to the highly successful use by hand application to anatomical tissues such as umbilical cords, blood vessels and intestinal tissues are particularly adapted for use in various flexible tubular appliances where it is desired to very effectively and temporarily seal a tubular conduit such as the conduits used in conventional catheter tubes.

Some types of catheter tubes include in addition to the main drainage tube or passage, one or more auxiliary and usually smaller rubber tubes, one of which is used to inflate a retainer or balloon. Some tubes have a third tube or passage through which water or fluid may be directed under pressure for purpose of flushing the bladder.

With my structure any one of the two or more tubes of the catheter may be very quickly constricted and perfectly sealed by the hand-applied clamp shown in Figs. 3 to 7 inclusive. The construction of these clamps with the detent or angularly disposed finger piece 20i enables the doctor or attendant to readily and quickly remove the clamp when the same is desired. The construction of the embossments or corrugations in addition to insuring a perfect constriction and seal of the tube, minimizes wear upon the rubber or other flexible element engaged with the result that the tubes of a catheter structure may be re-used over a long period of time without wear through constriction.

Previous to my invention, methods of restricting or closing the ends of such tubes as those used in catheter devices have been objectionable because the tubes are often actually sharply folded and tied, producing much wear, or in some instances, stoppers or plug elements were used at outer extremities. Such plug members sometimes inadvertently loosened and became detached, often causing deflation of the balloon or drainage of the liquid from the bladder before the same was desirable. With my improved structure, these objections are completely eliminated.

The structure of my clamp as disclosed in Figs. 3 to 5 inclusive, provides another feature which should be mentioned. It will be noted that the shorter and upper leg 20b is curved slightly along a concave line when viewed from above, while the lower leg 20c is substantially straight from the apex of the clamp to the outturned releasing detent. Thus, when the two legs of the clamp are pressed together by finger pressure the medial bowed portion of the upper leg 20b first contacts or cooperates with the upper surface of the longer leg and thereafter, when the locking portion 20h near the outer extremity of the longer leg is clinched over the extremity 20g of the shorter leg, a resilient tension is applied through this clinching action which will compensate or take up for any subsequent shrinkage in the tissue or other fabric of the tubular element.

From the foregoing description, it will be seen that I have provided an extremely simple clamp of the class described adapted to be manufactured from integral strips of somewhat ductile and bendable material at very low cost.

It will of course, be understood that various changes may be made in the form, details, arrangement and proportions of the parts without departing from the scope of my invention.

What I claim is:

1. A clamp for flexible tubular elements or the like comprising a pair of opposed clamping legs in the form of strip portions constructed from bendable material adapted to retain its shape when bent or folded, means for fixedly interconnecting said legs, one of said legs having an extension at one end thereof for folding over and clinching against the extremity of the other leg to secure said legs in clamping engagement against a tubular element and one of said legs having on the inner clamping surface thereof a series of ribs, said ribs having at least portions thereof which extend diagonally of said legs while nevertheless being in position to traverse the tubular element clamped.

2. A clamp for flexible tubular elements or the like comprising a pair of opposed clamping legs in the form of strip portions constructed from bendable material adapted to retain its shape when bent or folded, means for fixedly interconnecting said legs, one of said legs having an extension at one end thereof for folding over and clinching against the extremity of the other leg to secure said legs in clamping engagement against a tubular element, one of said legs having a rib on its inner or clamping surface, said rib having at least a portion thereof extending generally diagonally to said legs, the other of said legs having a channel on its inner or clamping surface opposed to said rib and complementary in shape thereto for producing an efficient clamping relation for sealing the tubular element.

3. The structure set forth in claim 2 wherein the said extension of one of said legs is free from ribs or channels to facilitate bending and clinching thereof over the end of the other leg.

4. A clamp for flexible tubular elements and the like comprising an integral metallic strip adapted to retain its shape when bent or deformed, said strip being before use, shaped in the general form of a V and having a pair of opposed clamping legs, one of said legs having an extension portion adapted to be bent over and clinched against the end of the other for securing the legs to compress a tubular element, one of said legs having a series of ribs on the inner or clamping face thereof, said ribs having at least portions thereof which extend diagonally of the leg and the other of said legs having on its inner or clamping surface a plurality of channels of complementary shape to and opposed to said ribs, said ribs and channels being formed by mating corrugations formed in said opposed clamping legs.

5. A clamp for flexible tubular elements and the like, comprising a pair of opposed clamping legs in the form of strip portions constructed from material having resiliency but being sufficiently ductile to be bent and to retain its shape when bent, means for fixedly interconnecting said legs in a preformed, general V-shape, one of said legs extending substantially straight and having an extension at one end thereof for folding over and clinching against the end of the other leg to secure said legs in clamping engagement against a tubular element, the other of said legs being convexly curved along its surface opposed to said first mentioned leg to cause said tubular element to be initially compressed between the intermediate portions of said opposed legs and to cause the intermediate portion of said second leg to be tensioned by the clinching of said extension portion against the end of the other leg to take up and compensate for shrinking of said tubular member after affixing of said clamp.

MATHER GARLAND.

REFERENCES CITED

The following references are of record in the file of this patent:

UNITED STATES PATENTS

| Number | Name | Date |
|--------|------|------|
| 400,627 | Angell | Apr. 2, 1889 |
| 748,298 | Monson | Dec. 29, 1903 |
| 1,583,919 | Flora | May 11, 1926 |
| 2,368,913 | Bolinger | Feb. 6, 1945 |
| 2,384,697 | Riccardi | Sept. 11, 1945 |